April 15, 1958     J. P. BOSCH     2,830,831
PIPE EXPANDER HAVING SEALING RING RETAINING
CAP FOR HYDRAULIC RAM
Filed April 27, 1953
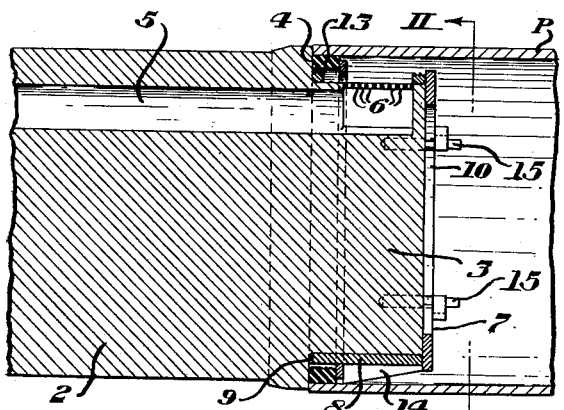
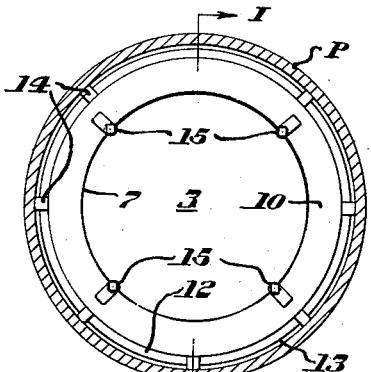
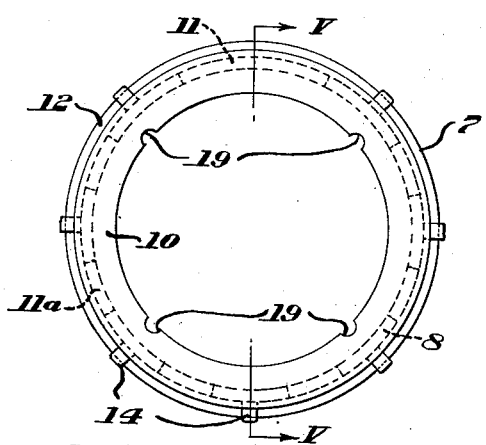
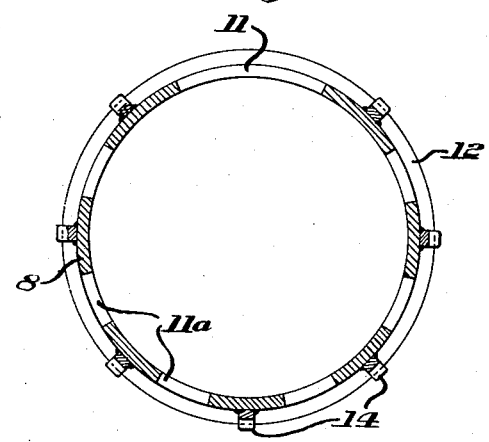
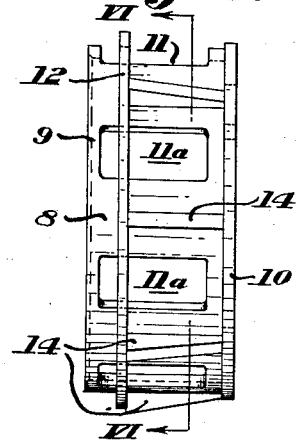
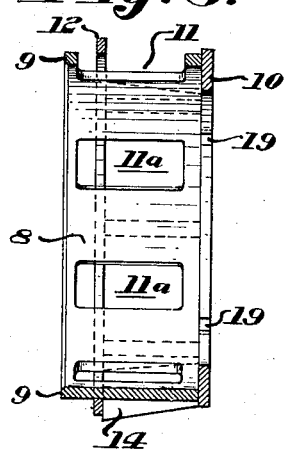
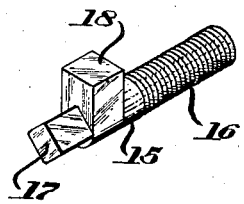
INVENTOR
John P. Bosch

United States Patent Office 2,830,831
Patented Apr. 15, 1958

2,830,831

PIPE EXPANDER HAVING SEALING RING RETAINING CAP FOR HYDRAULIC RAM

John P. Bosch, Youngstown, Ohio

Application April 27, 1953, Serial No. 351,305

5 Claims. (Cl. 285—347)

This invention relates to sealing mechanism for apparatus for applying pressure to pipes and particularly to mechanism whereby a sealing ring may be maintained in place on a portion of the apparatus through the treatment of successive pipes yet may easily be removed and replaced when desired.

My sealing mechanism is applicable to apparatus of various types for applying pressure to pipes. I have found that it has especial advantages in pipe expanders and for purposes of explanation and illustration I shall describe the invention as applied to a pipe expander. However, the invention may also be applied to pipe testers in which the pipe is not normally expanded.

In a type of pipe expanding machine to which my invention is applicable lengths of pipe may be expanded to uniformly size them and at the same time increase their strength due to the cold working effected by the expanding. A pipe may be positioned in the expanding machine whereupon a series of die-like members collectively called a mantle are disposed about the pipe so as to substantially enclose it except at its ends. After the mantle is in place about the pipe a ram is moved relatively to the pipe toward the pipe axially thereof at each end of the pipe, the leading end of each ram entering the pipe and each ram having an annular shoulder adapted to abut and be sealed to the end of the pipe. Thereafter the expanding fluid is admitted and expands and sizes the pipe in the mantle, all as well known to those skilled in the art.

Heretofore it has been the usual practice to place a pipe gasket or sealing ring inside the pipe at each end thereof so that when the rams enter the pipe the sealing rings are respectively disposed against the annular shoulders of the rams. When fluid under pressure is admitted into the pipe to expand the pipe into the mantle and to size and strengthen it as above mentioned the pressure forces the sealing rings against the flanges of the rams and against the inner faces of the pipe ends, thus effecting a seal at each end of the pipe. This procedure necessitated a man working at each end of the pipe to place the sealing ring in each pipe prior to expanding and another man working at each end of the pipe to remove the sealing ring at the end of the expanding operation. Except for the high labor cost the manual handling of the sealing rings as just described was advantageous in that it provided for expansion of the pipe to the extreme ends thereof so that the pipe throughout its entire length was properly sized in a single operation.

Other sealing arrangements have been employed wherein the ends of the pipe were pre-expanded and then sealed by fixed sealing rings in the expander. Such arrangements were not satisfactory because the outside diameter of the expanded pipe was not uniform from end to end.

My invention provides for uniformity of diameter of the expanded pipe along the entire length of the pipe while at the same time releasing the four men who handled the sealing rings as above described.

I provide, in apparatus for applying pressure to pipes comprising a member adapted to abut and be sealed to an end of a pipe, a sealing ring retainer connected with said member and adapted to enter the end of the pipe, the retainer having a shoulder facing said member and spaced therefrom to cooperate therewith in retaining in place with respect thereto a sealing ring for sealing said member to the interior of the pipe end. The retainer preferably also has guide means inclined from relatively small diameter adjacent the extremity of the guide means nearer the longitudinal center of the pipe to relatively great diameter approximating the interior diameter of the pipe adjacent the extremity of the guide means relatively remote from the longitudinal center of the pipe for facilitating entry of the retainer into the pipe.

I further provide, in a pipe expander comprising a ram having a portion adapted to enter an end of a pipe to be expanded and an annular shoulder adapted to abut the end of the pipe, a sealing ring retainer removably connected with the ram and having a shoulder facing the ram shoulder and spaced therefrom to cooperate therewith in retaining on the ram a sealing ring for sealing the ram shoulder to the interior of the pipe end. The retainer shoulder is preferably of smaller outside diameter than the ram shoulder and faces a portion of the ram shoulder. The retainer preferably has a positioning portion adapted to seat on a relatively inner portion of the ram shoulder and the retainer shoulder preferably faces a relatively outer portion of the ram shoulder but is of smaller outside diameter than the ram shoulder. The positioning portion of the retainer is preferably disposed to seat on the ram at the junction of the first mentioned portion thereof and the shoulder.

The sealing ring retainer preferably has a portion engaging the end surface of the ram and means are preferably provided cooperating with the ram and with said portion of the retainer for removably fastening the retainer to the ram. I desirably employ a plurality of fasteners turnably connected with the ram and each turnable through a fraction of a revolution between operative position to fasten the retainer in place on the ram and inoperative position to free the retainer for removal from the ram.

The retainer preferably also has guide means inclined from relatively small diameter adjacent the end of the ram to relatively great diameter approximating the interior diameter of the pipe to be expanded adjacent the retainer shoulder for facilitating entry of the ram into the pipe.

The ram preferably has a fluid passage therein emerging at the portion of the ram entering the pipe and through which to introduce into the pipe fluid under pressure. The sealing ring retainer may be in the form of a retaining cap removably appliable to the ram over the portion thereof entering the pipe end and having an opening therethrough to permit fluid to pass from the fluid passage in the ram to the interior of the pipe. The cap preferably has at its sides inclined guide means for facilitating entry of the ram into the pipe.

I further provide a sealing ring retaining cap for a pipe expander comprising a generally cylindrical skirt having a rim at one end, an end member at the end of the skirt opposite the end having the rim and a radial flange mounted outside the skirt intermediate the ends thereof and of greater diameter than the rim. The cap preferably has guide means mounted outside the skirt between the end of the skirt having the end member and the flange, the guide means having an outer surface inclined outwardly from the axis of the cap in the direction from the end of the cap having the end member toward the flange. The cap preferably has an opening therethrough to permit fluid to pass to the interior of a pipe to be expanded.

Other details, objects and advantages of the invention will become apparent as the following description of a present preferred embodiment thereof proceeds.

In the accompanying drawings I have shown a present preferred embodiment of the invention in which—

Figure 1 is a fragmentary axial cross-sectional view taken on the line I—I of Figure 2 of a pipe expander showing an end of the pipe to be expanded and the cooperating end of one of the expander rams with my improved sealing mechanism applied;

Figure 2 is a transverse cross-sectional view taken on the line II—II of Figure 1;

Figure 3 is a face view of the sealing ring retaining cap as viewed from the right in Figure 1;

Figure 4 is a side view of the cap;

Figure 5 is an axial cross-sectional view through the cap taken on the line V—V of Figure 3;

Figure 6 is a transverse cross-sectional view of the cap taken on the line VI—VI of Figure 4; and Figure 7 is a perspective view of one of the fasteners for removably fastening the cap to the ram.

The pipe expander has two coaxial rams adapted respectively to cooperate with the ends of a pipe to be expanded. The rams may be identical or not, but at least one of them has a portion projecting into the end of the pipe to be expanded through which expanding fluid is admitted to the interior of the pipe. In any event each ram seals the corresponding end of the pipe.

In Figures 1 and 2 the pipe to be expanded is designated P. The ram cooperating with one end of the pipe is designated 2. The ram 2 has a portion 3 adapted to enter the end of the pipe and an annular shoulder 4 adapted to abut the end of the pipe. The ram has therein a fluid passage 5 which emerges at the portion 3 of the ram as shown in Figure 1. While the fluid passages in the rams do not constitute the present invention, it may be mentioned that in one form of pipe expanding machine the ram which engages the end of the pipe P opposite the end shown in Fig. 1 may have a fluid passage like the fluid passage 5 and also another fluid passage, the latter mentioned fluid passage being for the admission of hydraulic fluid into the pipe. The passage 5 shown in Fig. 1 and the similar passage in the other ram may permit exhausting of the air within the pipe when hydraulic fluid is admitted. The air passes from within the pipe to the passage 5 through openings 6 in the portion 3 of the ram 2.

Thus the ram has an annular shoulder adapted to abut the end of the pipe and a reduced extremity extending beyond the annular shoulder into the end of the pipe. Provision must be made for sealing the ram to the pipe so that the fluid pressure in the pipe may be maintained to bring about the expansion and sizing of the pipe in the mantle. The mantle is not shown in the drawings as it may be conventional, its structure being well known to those skilled in the art. The mantle has nothing to do with the present invention and the present invention, as above indicated, is adaptable to pipe testing machines not having a mantle.

The structure above described may all be conventional. To provide for maintaining a sealing ring in place on the ram through the expanding of successive pipes and at the same time to prepare for easy removal thereof I provide a sealing ring retainer or retaining cap designated generally by reference numeral 7 and shown separately in each of Figures 3, 4, 5 and 6. The cap is shown applied to the end of the ram in Figures 1 and 2. It comprises a generally cylindrical skirt 8 having a rim 9 at one end and an end member 10 at the opposite end. The cap is shaped to fit over the portion 3 of the ram as shown in Figure 1. The skirt 8 of the cap is provided with an opening 11 therethrough to permit air to pass from the interior of the pipe to the passage 5 and other openings 11a to permit the expanding fluid within the pipe to pass within the sealing ring presently to be described. When the cap is applied to the ram the end member 10 of the cap seats against the end surface of the ram as shown in Figure 1 and also the rim 9 seats on the ram at the junction of the portion 3 and the shoulder 4, also as shown in Figure 1.

Disposed about the cap and welded or otherwise suitably fastened to the skirt thereof is a radial flange in the form of a ring 12 which provides at its left-hand face viewing Figures 1 and 5 an annular shoulder facing the annular shoulder 4 of the ram and spaced therefrom to cooperate therewith in retaining in place a sealing ring for sealing the ram shoulder to the interior of the pipe end. The sealing ring is shown in Figure 1 and designated 13. The shoulder provided by the ring 12 is of smaller outside diameter than the ram shoulder 4 as the pipe P must contain the ring 12 but abut the ram shoulder 4 as shown in Figure 1. Thus the shoulder provided by the ring 12 faces a portion of the ram shoulder outwardly of the portion of the ram shoulder engaged by the rim 9 and inwardly of the portion of the ram shoulder engaged by the pipe P. The sealing ring 13 is disposed between the ram shoulder and the shoulder provided by the ring 12 of the retaining cap in position to seal against the interior of the pipe end as shown in Figure 1. The axial distance between the ram shoulder 4 and the face of the ring 12 disposed toward the shoulder 4 is slightly greater than the axial dimension of the sealing ring 13 when not subjected to the action of pressure fluid therewithin. This is to insure that after release of pressure within the sealing ring there will be no interference with normal inward contraction of the sealing ring. If the sealing ring when not subjected to the action of pressure fluid therewithin were in engagement with both the shoulder 4 and the ring 12 its normal inward contraction might be impaired with the result that the end of a pipe being introduced thereover would catch against the sealing ring. The construction which I employ insures normal contraction of the sealing ring after each pipe expanding operation so that the succeeding pipe can be properly introduced over the sealing ring.

When the sealing ring 13 is applied it is maintained in position about the extremity of the cap skirt 8 by its own contractibility. Fig. 1 shows the position and condition of the sealing ring when subjected internally to the action of pressure fluid. The pressure forces the sealing ring outwardly away from the cap skirt into tight sealing engagement with the interior of the pipe and at the same time causes some axial elongation of the sealing ring to cause it to engage simultaneously both the shoulder 4 and the ring 12. I do not need to have as many sizes of sealing rings as there are sizes of pipes as due to the resiliency and contractibility of the sealing rings I may use one size of sealing ring for several sizes of pipes. I am here referring to internal pipe diameters. The internal diameters of different pipes may in some cases differ simply because the pipes are of different wall thicknesses, the external diameters being the same.

The cap 7 also preferably has guide means shown in the drawings as being provided by generally wedge-shaped members 14, having their outer faces disposed generally in the surface of the frustum of a cone inclined from relatively small diameter adjacent the end of the ram to relatively great diameter approximating the interior diameter of the pipe P adjacent the ring 12 as shown in Figure 1 for facilitating entry of the ram into the pipe. The members 14 may be welded or otherwise suitably fastened to the exterior of the skirt 8.

The retaining cap may be maintained in place on the ram by any suitable fastening means. Bolts serving to hold together portions of the ram may simultaneously serve to maintain the retaining cap in place on the ram. I preferably provide means cooperating with the end of the ram and with the retaining cap for removably fastening the retaining cap to the ram. I show a plurality of fasteners 15 turnably connected with the ram and each turnable through a fraction of a revolution between operative position to fasten the cap in place on the ram and inoperative position to free the cap for removal from the ram. One of the fasteners is shown in Figure 7. It comprises a bolt having a shank threaded at 16 and a head 17 adapted for application of a wrench, the bolt having a lateral projection 18 extending in one direction only from the shank so that when the bolt is turned to a position in which the projection 18 extends outwardly or away from the axis of the cap the projection overlies the end member 10 of the cap as shown in Figure 2 to maintain the cap in place on the ram. Each of the bolts may be turned through 180° to position the projections 18 inwardly or pointing toward the axis of the cap thus freeing the cap for removal and allowing the sealing ring 13 to be removed and replaced.

While the end member 10 of the cap may take various forms it is shown as in Figure 2 in the form of a ring with semicircular cutouts 19 in its inner edge each receiving half of the shank of the bolt 15 as shown in Figure 2.

When the cap 7 is maintained in place on the ram as in Figure 1 the sealing ring 13 is likewise maintained in place on the ram and the ram with the same sealing ring thereon may be employed in expanding a number of pipes in successive operations. No separate handling of the sealing ring is required. When it is desired to replace a sealing ring with a new sealing ring the cap is removed as above explained, a new sealing ring is applied and the cap is again fastened onto the end of the ram.

When fluid under pressure is admitted into the pipe P when sealed to the rams at opposite ends of the pipe the fluid presses the sealing rings 13 against the ram shoulders and against the inner surfaces of the pipe ends to maintain the fluid pressure within the pipe and provide for expansion and sizing of the pipe as above explained.

While I have shown and described a present preferred embodiment of the invention it is to be distinctly understood that the invention is not limited thereto but may be otherwise variously embodied within the scope of the following claims.

I claim:

1. In a pipe expander comprising a ram having a portion adapted to enter an end of a pipe to be expanded, an annular shoulder adapted to abut the end of the pipe and a fluid passage in the ram emerging at the first mentioned portion thereof, a sealing ring retaining cap removably appliable to the ram over the first mentioned portion thereof, having an opening therethrough to permit fluid to pass between the fluid passage in the ram and the interior of the pipe and also having a shoulder facing the ram shoulder and spaced therefrom to cooperate therewith in retaining on the ram a sealing ring for sealing the ram shoulder to the interior of the pipe end and a sealing ring retained on the ram by the retaining cap and whose axial dimension when in repose is somewhat less than the axial distance between said shoulders.

2. In a pipe expander comprising a ram having a portion adapted to enter an end of a pipe to be expanded, an annular shoulder adapted to abut the end of the pipe and a fluid passage in the ram emerging at the first mentioned portion thereof, a sealing ring retaining cap removably appliable in fixed position to the ram over the first mentioned portion thereof, having an opening therethrough to permit fluid to pass between the fluid passage in the ram and the interior of the pipe, having a shoulder facing the ram shoulder and spaced therefrom to cooperate therewith in retaining on the ram a sealing ring for sealing the ram shoulder to the interior of the pipe and also having at its sides inclined guide means for facilitating entry of the ram into the pipe.

3. In a pipe expander comprising a ram having a portion adapted to enter an end of a pipe to be expanded, an annular shoulder adapted to abut the end of the pipe and a fluid passage in the ram emerging at the first mentioned portion thereof, a sealing ring retaining cap connected with the ram and comprising a generally cylindrical skirt having a rim at one end adapted to abut said annular shoulder, an end member at the end of the skirt opposite the end having said abutting rim and a radially extending annular flange mounted outside the skirt intermediate the ends thereof and of greater diameter than said abutting rim and opposed to said annular shoulder for maintaining a sealing ring in place against the shoulder.

4. In a pipe expander comprising a ram having a portion adapted to enter an end of a pipe to be expanded, an annular shoulder adapted to abut the end of the pipe and a fluid passage in the ram emerging at the first mentioned portion thereof, a sealing ring retaining cap connected with the ram and comprising a generally cylindrical skirt having a rim at one end adapted to abut said annular shoulder, an end member at the end of the skirt opposite the end having said abutting rim, a radially extending annular flange mounted outside the skirt intermediate the ends thereof and of greater diameter than said abutting rim and opposed to said annular shoulder for maintaining a sealing ring in place against the shoulder and guide means mounted outside the skirt between the end of the skirt having the end member and the flange, the guide means having an outer surface inclined outwardly from the axis of the cap in the direction from the end of the cap having the end member toward the flange.

5. In a pipe expander comprising a ram having a portion adapted to enter an end of a pipe to be expanded, an annular shoulder adapted to abut the end of the pipe and a fluid passage in the ram emerging at the first mentioned portion thereof, a sealing ring retaining cap connected with the ram and comprising a generally cylindrical skirt having a rim at one end adapted to abut said annular shoulder, an end member at the end of the skirt opposite the end having said abutting rim and a radially extending annular flange mounted outside the skirt intermediate the ends thereof and of greater diameter than said abutting rim and opposed to said annular shoulder for maintaining a sealing ring in place against the shoulder, the cap having an opening therethrough to permit fluid to pass between the interior of the cap and the interior of a pipe to be expanded.

References Cited in the file of this patent

UNITED STATES PATENTS

| | | |
|---|---|---|
| 523,009 | Riddell | July 17, 1894 |
| 709,276 | Palfrey | Sept. 16, 1902 |
| 794,110 | McDowell | July 4, 1905 |
| 872,659 | Lord | Dec. 3, 1907 |
| 1,525,101 | McWane | Feb. 3, 1925 |
| 1,805,962 | Thomas | May 19, 1931 |
| 2,623,570 | Resser | Dec. 30, 1952 |
| 2,631,640 | Zallea | Mar. 17, 1953 |
| 2,667,136 | Reichl | Jan. 26, 1954 |
| 2,671,339 | Krause | Mar. 9, 1954 |